(12) United States Patent
Yoo et al.

(10) Patent No.: US 10,824,914 B2
(45) Date of Patent: Nov. 3, 2020

(54) APPARATUS AND METHOD OF DATA GENERATION FOR OBJECT DETECTION BASED ON GENERATIVE ADVERSARIAL NETWORKS

(71) Applicant: Kwangwoon University Industry-Academic Collaboration Foundation, Seoul (KR)

(72) Inventors: Ji Sang Yoo, Seoul (KR); Ju Won Kwon, Incheon (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 107 days.

(21) Appl. No.: 16/208,770

(22) Filed: Dec. 4, 2018

(65) Prior Publication Data

US 2020/0012896 A1 Jan. 9, 2020

(30) Foreign Application Priority Data

Jul. 4, 2018 (KR) .......................... 10-2018-0077566

(51) Int. Cl.
*G06K 9/62* (2006.01)
*G06T 7/70* (2017.01)
*G06T 7/00* (2017.01)

(52) U.S. Cl.
CPC ......... *G06K 9/6262* (2013.01); *G06K 9/6256* (2013.01); *G06T 7/70* (2017.01);
(Continued)

(58) Field of Classification Search
CPC .. G06K 9/4628; G06K 9/6215; G06K 9/6257; G06K 9/6262; G06K 9/627;
(Continued)

(56) References Cited

U.S. PATENT DOCUMENTS

2003/0097568 A1* 5/2003 Choi ..................... G06T 1/0042
713/176
2009/0154778 A1* 6/2009 Lei ....................... G06K 9/6247
382/112

(Continued)

OTHER PUBLICATIONS

Jeongwan Shin, Yunseok Noh, Se-Young Park, "Generating Multi-Class Images Using a Generative Adversarial Network", Korea Information Science Society, Jun. 2017, 811-813.

*Primary Examiner* — Diane D Mizrahi
(74) *Attorney, Agent, or Firm* — Dinsmore & Shohl LLP; Yongsock Choi, Esq.

(57) ABSTRACT

An apparatus for generating data based on generative adversarial networks (GANs) is provided. The apparatus includes a first generator configured to receive input data and generate a first fake image, a first discriminator configured to receive the first fake image generated by the first generator and a first real image and verify whether an image is fake or real, a second generator configured to receive the first fake image and generate a second fake image; and a second discriminator configured to receive the second fake image and a second real image and verify whether an image received by the second discriminator is fake or real. The apparatus improves an object recognition performance as compared with a typical object recognition algorithm by generating an image of a class of which a sufficient database is not secured so as to reduce an object misrecognition caused by an insufficient amount of data.

14 Claims, 6 Drawing Sheets

(52) U.S. Cl.
CPC ...... *G06T 7/97* (2017.01); *G06T 2207/20081* (2013.01); *G06T 2207/20084* (2013.01)

(58) Field of Classification Search
CPC ........... G06K 9/00288; G06K 9/00624; G06K 9/6271; G06K 9/6277; G06K 9/6282
See application file for complete search history.

(56) References Cited

U.S. PATENT DOCUMENTS

| | | |
|---|---|---|
| 2017/0330348 A1* | 11/2017 | Park .......................... G06T 7/90 |
| 2017/0365038 A1 | 12/2017 | Denton et al. |
| 2018/0150055 A1* | 5/2018 | Shapiro .............. G05B 19/4063 |
| 2018/0225876 A1* | 8/2018 | Lim ..................... G06T 19/006 |

* cited by examiner

APPARATUS AND METHOD OF DATA GENERATION FOR OBJECT DETECTION BASED ON GENERATIVE ADVERSARIAL NETWORKS

CROSS-REFERENCE TO RELATED APPLICATION(S)

This application claims the priority benefit of Korean Patent Application No. 10-2018-0077566 filed on Jul. 4, 2018, in the Korean Intellectual Property Office, the disclosure of which is incorporated herein by reference for all purposes.

BACKGROUND

1. Field

One or more example embodiments relate to an apparatus and a method of data generation for object detection based on generative adversarial networks (GANs) and, more particularly, to a GANs-based data generation apparatus and method for object detection using GANs to generate an image based on deep learning in association with an object detection algorithm of an image processing field.

2. Description of Related Art

An object detection algorithm of an image processing field has been studied in various ways to be used in various fields such as a system for detecting a pedestrian on a road, and an intelligent robot capable of interacting with a person.

Recently, researches are being conducted to detect an object for an image or a video through a machine learning of the image. A typical detection algorithm has an issue of misrecognizing a class that does not exist in a data set such as Image-net, Coco dataset, and the like. For example, a class with insufficient data, such as a North Korean tank, was mistakenly recognized as a boat.

To solve this, an attempt has been made to supplement data by generating an image using the GANs, but an image which is inappropriate for learning to detect an object may be generated due to an insufficient resolution.

SUMMARY

An aspect is to improve an object recognition performance as compared with a typical object recognition algorithm by generating an image of a class of which a sufficient database is not secured so as to reduce an object misrecognition caused by an insufficient amount of data.

Another aspect is to generate an image having a higher resolution as compared with a typical image generation algorithm by generating the image in two steps.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided an apparatus for generating data based on generative adversarial networks (GANs), the apparatus including a first generator configured to receive input data and generate a first fake image and a first discriminator configured to receive the first fake image generated by the first generator and a first real image and verify whether an image is fake or real.

The apparatus may include a second generator configured to receive the first fake image and generate a second fake image and a second discriminator configured to receive the second fake image generated by the second generator and a second real image and verify whether an image is fake or real.

A size of the first fake image may be greater than a size of the second fake image and a size of the first real image may be greater than a size of the second real image.

The size of the second fake image may be a size of a target image to be generated.

The sizes of the first fake image and the first real image may be as large as one of 4 times, 9 times, 16 times, and 25 times the sizes of the second fake image and the second real image.

The first discriminator, the first generator, the second discriminator, and the second generator may be configured to perform machine learning using at least one of a deep neural network (DNN), a convolutional neural network (CNN), and a recurrent neural network (RNN).

The apparatus may further include an image acquirer configured to acquire an image from the second generator and an object detector configured to detect an object from the image acquired by the image acquirer.

The object detector may be configured to detect the object using the CNN trained based on the image acquired by the image acquirer.

According to another aspect, there is also provided a method of generating data based on GANs, the method including a first generating operation of receiving input data and generating a first fake image and a first verifying operation of receiving the first fake image generated in the first generating operation and a first real image and verifying whether an image is fake or real.

The method may include a second generating operation of receiving the first fake image and generating a second fake image and a second verifying operation of receiving the second fake image generated in the second generating operation and a second real image and verifying whether an image is fake or real.

A size of the first fake image may be greater than a size of the second fake image and a size of the first real image may be greater than a size of the second real image.

The size of the second fake image may be a size of a target image to be generated.

The sizes of the first fake image and the first real image may be as large as one of 4 times, 9 times, 16 times, and 25 times the sizes of the second fake image and the second real image.

The first generating operation, the first verifying operation, the second generating operation, and the second verifying operation may perform machine learning using at least one of a DNN, a CNN, and an RNN.

The method may further include an image acquiring operation of acquiring an image generated in the second generating operation and an object detecting operation of detecting an object from the image acquired in the image acquiring operation.

The object detecting operation may detect the object using the CNN trained based on the image acquired by the image acquirer.

According to example embodiments, it is possible to improve an object recognition performance as compared with a typical object recognition algorithm by generating an image of a class of which a sufficient database is not secured so as to reduce an object misrecognition caused by an insufficient amount of data.

According to example embodiments, it is possible to generate an image having a higher resolution as compared with a typical image generation algorithm by generating the image in two steps.

The effects obtainable from the present disclosure are non-limited by the above-mentioned effects. And, other unmentioned effects can be clearly understood from the following description by those having ordinary skill in the technical field to which the present disclosure pertains.

DETAILED DESCRIPTION

Figure 1:
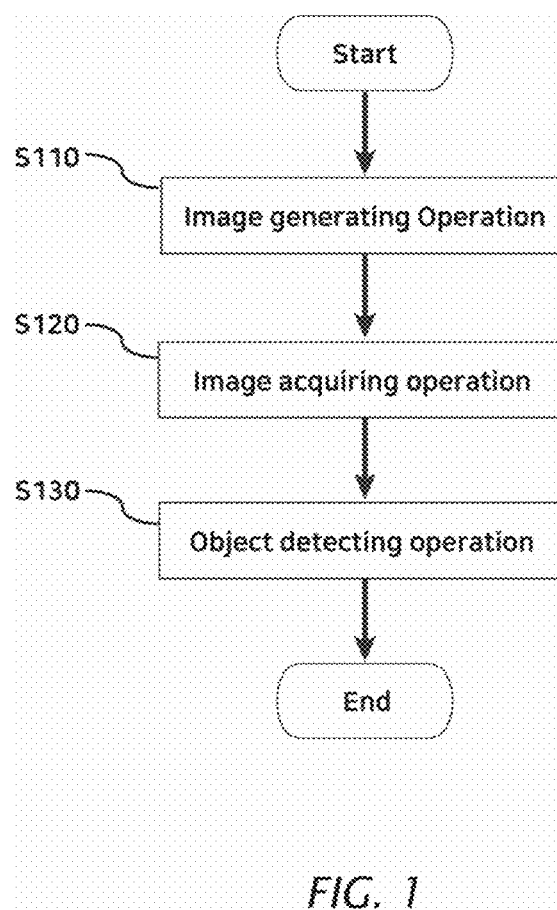
FIG. 1 is a flowchart illustrating an object detection method according to an example embodiment.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. In drawings, parts irrelevant to the description are omitted for the simplicity of explanation, and like reference numerals denote like parts through the whole document.

The terminology used herein is for the purpose of describing particular example embodiments only and is not intended to be limiting. As used herein, the singular forms "a," "an," and "the," are intended to include the plural forms as well, unless the context clearly indicates otherwise.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, constituent units included in example embodiments of the present disclosure are independently illustrated to describe different specific functions, and each of the constituent units may not indicate separate hardware or one software element. That is, the respective constituent units are arranged and included for convenience of description. Among the constituent units, two or more constituent units may be combined to serve as one constituent unit, and one constituent unit may be divided into a plurality of constituent units to perform a function. The integrated example embodiment of the constituent units and the divided example embodiments of each constituent unit are included in the claims as long as they do not depart from the spirit of the present disclosure.

Furthermore, the following embodiments are provided for further clear explanation for those of ordinary skill in the art and thus, shapes and sizes of elements shown in the drawings may be exaggerated for the clear explanation.

Hereinafter, example embodiments will be described in detail with reference to the accompanying drawings.

FIG. 1 is a flowchart illustrating an object detection method according to an example embodiment.

Referring to FIG. 1, a procedure for object detection may include image generating operation S110, image acquiring operation S120, and object detecting operation S130. The image generating operation S110 may generate images of classes that have limited performances of learning based on existing data. The image generating operation S110 may use a generative adversarial networks (GANs)-based data generation apparatus of FIG. 3 and a GANs-based data generation method of FIG. 5, which will be described later. The image acquiring operation S120 may acquire an image using an image database accumulated or an image generated in the image generating operation S110. The object detecting operation S130 may be an operation of detecting an object by performing learning using the image acquired in the image acquiring operation S120.

In terms of a typical object detection algorithm based on machine learning, there is an issue of misrecognizing a class that does not exist in a data set to be learned. For example, a class with insufficient data, such as a North Korean tank, may be mistakenly recognized as a boat.

Thus, it is necessary to generate images of the database that is insufficient to detect object in order to improve class recognition accuracy in the object detection. The image generating operation S110 may generate an image to supplement the insufficient data. The image may be generated based on GANs.

Figure 2:
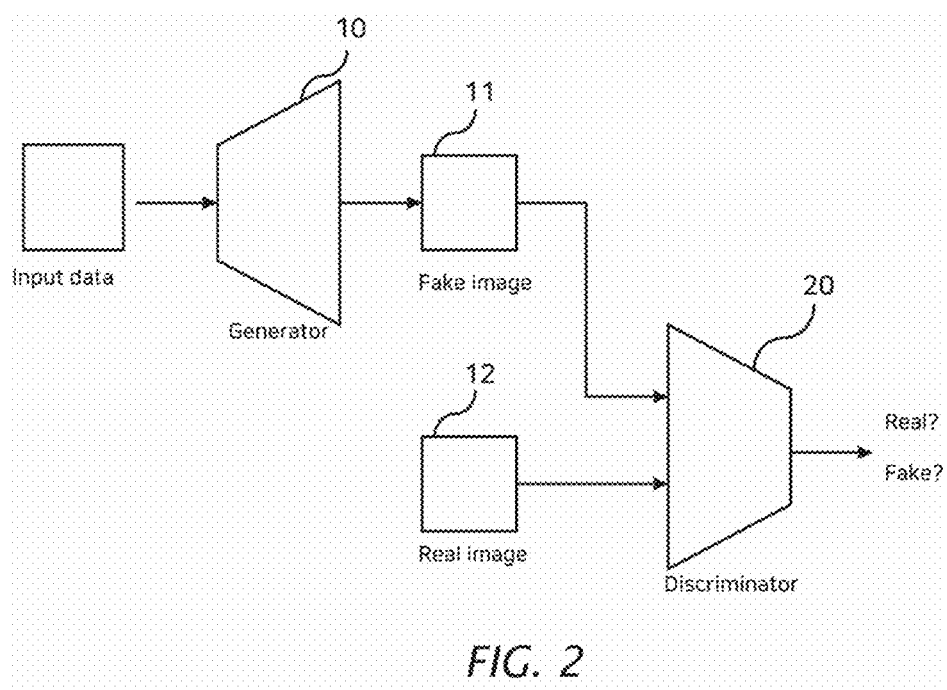
FIG. 2 is a block diagram illustrating an image generation scheme based on generative adversarial networks (GANs) according to a related art.

FIG. 2 is a block diagram illustrating an image generation scheme based on GANs according to a related art.

Referring to FIG. 2, a typical GANs may be an unsupervised-learning-based generation model used for adversarial training of two networks using a generator 10 and a discriminator 20. The generator 10 may be trained to generate a fake image 11 similar to a real image 12 using input data being received. A noise may be input as the input data. The noise may be based on a certain probability distribution and may be, for example, data generated based on Zero-Mean Gaussian.

The discriminator 20 may be trained to discriminate between the real image and the fake image generated by the generator 10. For example, the training may be performed so that a high probability is output when the real image 12 is input and a probability is reduced when the fake image 11 is input. The probability is a probability calculated by the discriminator 20 whether an image inputted to the discriminator 20 is a real image or a fake image. As such, the discriminator 20 may be gradually trained to discriminate between the real image 12 and the fake image 11.

When the generator 10 and the discriminator 20 are sufficiently trained, the generator 10 may allow a data distribution of the generated fake image 11 to follow a data distribution of the real image 12. In this example, the discriminator 20 may discriminate any image 11 generated by the generator 10 to be correct or incorrect with a probability of 1/2. Such state may be a state in which the discriminator 20 is not able to verify whether the fake image 11 is real or fake. The fake image 11 generated in the state may be added to a data set for object detection and used in the machine learning for the object detection.

However, in such a case of using the GANs in the related art, when a model has a low performance, a good result may not be guaranteed even though the training is performed with a probability converging on 1/2. Also, it is difficult to generate a high resolution image.

In order to overcome such issues, a data generation apparatus that generates a fake image having a high resolution is used in the present disclosure.

Figure 3:
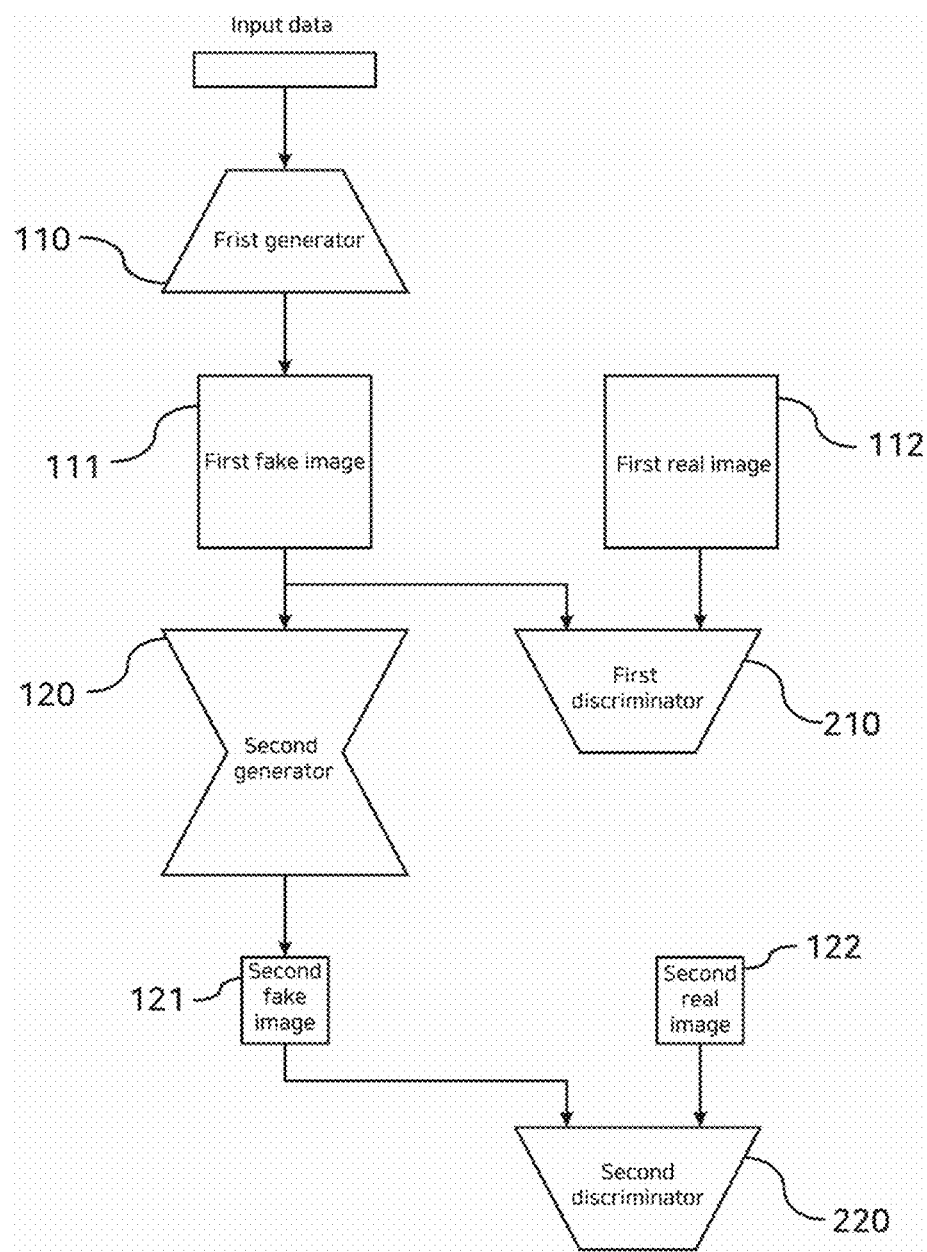
FIG. 3 is block diagram illustrating a data generation apparatus according to an example embodiment.

FIG. 3 is block diagram illustrating a data generation apparatus according to an example embodiment.

Referring to FIG. 3, a GANs-based data generation apparatus may include a first generator 110 and a first discriminator 210.

Also, the GANs-based data generation apparatus may further include a second generator 120 and a second discriminator 220.

The first generator 110, the first discriminator 210, the second generator 120, and a second discriminator 220 may include program modules that may be executed by one or more processors. The program modules may be in the form of operating systems, application program modules, or other program modules, while they may be physically stored on a variety of commonly known storage devices. Such program modules may include, but not limited to, routines, subroutines, programs, objects, components, instructions, data structures, and the like for performing specific tasks or executing specific abstract data types as will be described below in accordance with the present disclosure.

The first generator 110 may receive input data and generate a first fake image 111. The first discriminator 210 may receive the first fake image 111 generated by the first generator 110 and a first real image 112 and verify whether an image is fake or real. Here, a size of the first fake image 111 generated by the first generator 110 may be the same as a size of the first real image 112.

The second generator 120 may receive the first fake image 111 and generate a second fake image 121. The second discriminator 220 may receive the second fake image 121 generated by the second generator 120 and a second real image 122 and verify whether an image is fake or real. Here, a size of the second fake image 121 generated by the second generator 120 may be the same as a size of the second real image 122.

The first generator 110, the first discriminator 210, the second generator 120, and the second discriminator 220 may perform machine learning using at least one of a deep neural network (DNN), a convolutional neural network (CNN), and a recurrent neural network (RNN).

When a final image generated by the apparatus is a target image, a size of the target image may be the same as the size of the second fake image 121 generated by the second generator 120. Here, the second fake image 121 corresponding to the target image may be an image generated by the second generator 120 after the first generator 110, the first discriminator 210, the second generator 120, and the second discriminator 220 are sufficiently trained.

Here, the "being sufficiently trained" may indicate that the second discriminator 220 becomes unable to verify whether the second fake image 121 generated by the second generator 120 is a real image or a fake image. Also, a state in which a verification is unavailable may be a state in which a probability of 1/2 is output as a probability that the second discriminator 220 verifies the image generated by the second generator 120 to be fake.

To increase a resolution of the target image, the size of the first fake image 111 generated by the first generator 110 may be set to be greater than the size of the second fake image 121 generated by the second generator 120. Also, the size of the first real image 112 input to the first discriminator 210 may be greater than the size of the second real image 122 input to the second discriminator 220.

Specifically, the first fake image 111 may be generated by the first generator 110 to have the size greater than the size of the target image. For example, the sizes of the first fake image 111 may be as large as one of 4 times, 9 times, 16 times, and 25 times the sizes of the target image. That is, when a size of the target image is 256×256, the first fake image 111 may have a size of 1024×1024. Also, the first real image 112 having the same size as the first fake image 111 may be input to the first discriminator 210 to train the first generator 110 and the first discriminator 210.

The second generator 120 may generate the second fake image 121 based on the first fake image 111 generated by the first generator 110. Here, the second fake image 121 may be generated to have the size less than the size of the first fake image 111. Functionally, the second fake image 121 may be generated through a down-sampling based on the first fake image 111. Also, the second real image 122 having the same size as the second fake image 121 may be input to the second discriminator 220 to train the second generator 120 and the second discriminator 220.

As such, the GANs-based data generation apparatus may generate an image with the increased resolution as compared to a resolution of an image generated according to the related art.

Figure 4:
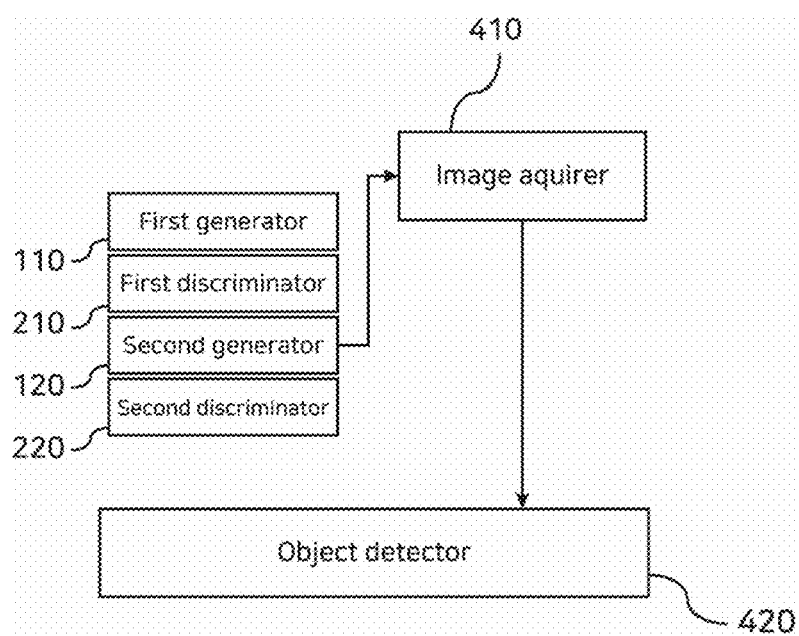
FIG. 4 is a block diagram illustrating a data generation apparatus for object detection according to an example embodiment.

FIG. 4 is a block diagram illustrating a data generation apparatus for object detection according to an example embodiment.

Referring to FIG. 4, a data generation apparatus for object detection may further include an image acquirer 410 and an object detector 420.

The image acquirer 410 may acquire the second fake image 121 generated by the second generator 120. The object detector 420 may learn images acquired by the image acquirer 410 and detect an object by searching for the object from a target image for object detection. The image acquired by the image acquirer 410 may be learned by a CNN, so that the object detector 420 detects the object using the trained CNN.

Figure 5:
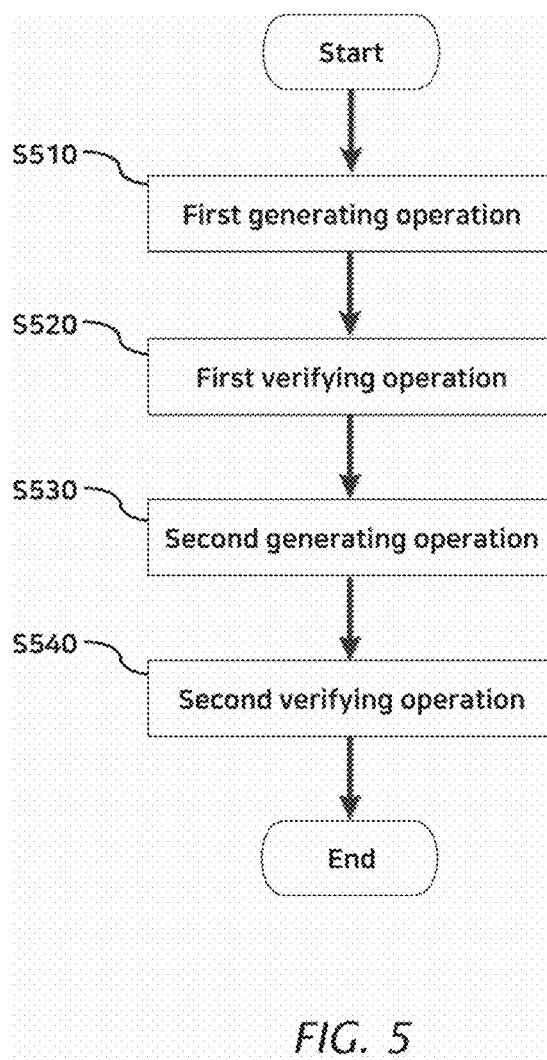
FIG. 5 is a flowchart illustrating a data generation method according to an example embodiment.

FIG. 5 is a flowchart illustrating a data generation method according to an example embodiment.

Referring to FIG. 5, first generating operation S510, first verifying operation S520, second generating operation S530, and second verifying operation S540 may correspond to the image generating operation S110 of FIG. 1. Also, the data generation method according to an example embodiment may be executed or performed by the data generation apparatus described with reference to FIG. 3.

First, the data generation apparatus may receive input data and generate a first fake image in S510. The data generation apparatus may receive the first fake image and a first real image and verify whether an image is fake or real in S520. When generating the first fake image, the data generation apparatus may generate the first fake image to have a size greater than a size of a target image.

Thereafter, the data generation apparatus may receive the first fake image and generate a second fake image in S530. The data generation apparatus may receive the second fake image and a second real image and verify whether an image is fake or real in S540. When generating the second fake image, the data generation apparatus may generate the second fake image to have a size less than the size of the first fake image. For example, the size of the second fake image may be the size of the target image.

When it is difficult to verify whether the second fake image is fake or real in the second verifying operation S540, the second fake image may be used as the target image.

The data generation apparatus may generate the first fake image having the size greater than the size of the target image (the second fake image) in the first generating operation S510 and generate the second fake image to have the same size as the target image based on the first fake image in the second generating operation S530, thereby achieving an effect of generating an image with an increased resolution when compared to an image generated based on a GANs according to a related art.

Figure 6:
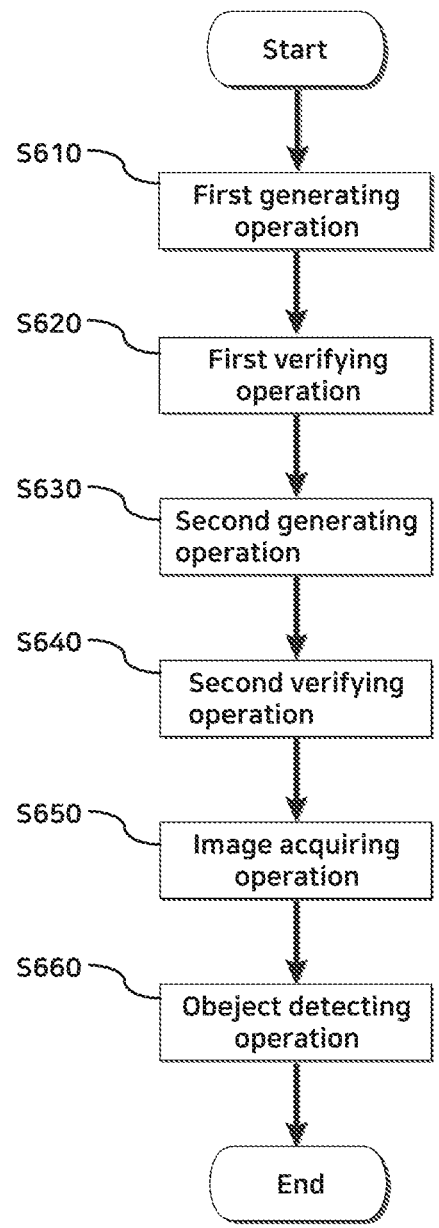
FIG. 6 is a flowchart illustrating a data generation method for object detection according to an example embodiment.

FIG. 6 is a flowchart illustrating a data generation method for object detection according to an example embodiment.

Referring to FIG. 6, a second fake image, that is, a target image generated through first generating operation S610, first verifying operation S620, second generating operation S630, and second verifying operation S640 may be acquired as data for object detection in S650. A CNN may learn the image acquired in image acquiring operation S650. An operation of detecting an object using the trained CNN may be performed in S660.

The above-described GANs-based data generation apparatus and method for object detection may improve a performance of an object detection algorithm by generating an image and performing learning based on the generated image. Also, it will be useful in related fields to increase an image resolution. For example, it will be applicable to various technologies for object detection in an environment such as an intelligent camera, a closed-circuit television (CCTV), an artificial intelligent robot, and an autonomous vehicle.

In addition, it is possible to generate images of classes that have limited performances of learning based on existing data. Thus, it can be applied to detect a tank or a soldier with a security camera for national defense when the learning is supported by generating pictures of a North Korean tank and North Korean troops that are difficult to obtain in general.

Various embodiments disclosed in the present specification may be implemented by hardware, middleware, microcode, software, and/or a combination thereof. For example, various embodiments may be implemented in one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform functions presented herein, or a combination thereof.

Further, for example, various embodiments may be recorded or encoded in a computer-readable medium including commands. The commands recorded or encoded in the computer-readable medium may allow the programmable processor or other processor to perform a method, for example, when the commands are executed. The computer-readable medium includes all communication media including a computer storage medium and a predetermined medium that facilitates transfer of a computer program from one place to the other place. A storage medium may be a predetermined available medium which may be accessed by a computer. For example, the computer-readable medium may include a RAM, a ROM, an EEPROM, a CD-ROM, or other optical disk storage medium, a magnetic disk storage medium or other magnetic storage device, or predetermined other media which may be used to transport or storage a desired program code in the form of the commands which may be accessed by the computer or data structures.

The hardware, software, firmware, and the like may be implemented in the same device or individual devices so as to support various operations and functions disclosed in the present specification. Additionally, in the present disclosure, constituent elements, units, modules, components, and the like disclosed as "unit" may be individually implemented as logic devices which are operated together or individually, but may be mutually operated. Description of different features of the modules, the units, and the like is intended to emphasize different functional embodiments and does not requisitely mean that the embodiments need to be implemented by individual hardware or software components. On the contrary, functions associated with one or more modules or units may be performed by individual hardware or software components or integrated in common or individual hardware or software components.

Operations are illustrated in drawings in a specific order, but it should not be appreciated that the operations need to be performed in a specific order or a sequential order which is illustrated or all illustrated operations need to be performed in order to achieve a desired result. In a predetermined environment, multi-tasking or parallel tasking may be advantageous. Moreover, in the aforementioned embodiments, it should not be appreciated that various components need to be distinguished in all embodiments and it should be appreciated that the disclosed constituent elements may be generally together integrated in a single software product or packaged to multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for generating data based on generative adversarial networks (GANs), the apparatus comprising:
    a first generator configured to receive input data and generate a first fake image;
    a first discriminator configured to receive the first fake image generated by the first generator and a first real image and verify whether an image received by the first discriminator is fake or real;
    a second generator configured to receive the first fake image and generate a second fake image; and
    a second discriminator configured to receive the second fake image generated by the second generator and a second real image and verify whether an image received by the second discriminator is fake or real.

2. The apparatus of claim 1, wherein a size of the first fake image is greater than a size of the second fake image, and
    a size of the first real image is greater than a size of the second real image.

3. The apparatus of claim 2, wherein the size of the second fake image is a size of a target image to be generated.

4. The apparatus of claim 2, wherein the sizes of the first fake image and the first real image are as large as one of 4 times, 9 times, 16 times, and 25 times the sizes of the second fake image and the second real image.

5. The apparatus of claim 1, wherein the first discriminator, the first generator, the second discriminator, and the second generator are configured to perform machine learning using at least one of a deep neural network (DNN), a convolutional neural network (CNN), and a recurrent neural network (RNN).

6. The apparatus of claim 1, further comprising:
an image acquirer configured to acquire an image from the second generator; and
an object detector configured to detect an object from the image acquired by the image acquirer.

7. The apparatus of claim 6, wherein the object detector is configured to detect the object using the CNN trained based on the image acquired by the image acquirer.

8. A method of generating data based on generative adversarial networks (GANs), the method comprising:
a first generating operation of receiving input data and generating a first fake image;
a first verifying operation of receiving the first fake image generated in the first generating operation and a first real image and verifying whether an image received by the first discriminator is fake or real;
a second generating operation of receiving the first fake image and generating a second fake image; and
a second verifying operation of receiving the second fake image generated in the second generating operation and a second real image and verifying whether an image received by the second discriminator is fake or real.

9. The method of claim 8, wherein a size of the first fake image is greater than a size of the second fake image and a size of the first real image is greater than a size of the second real image.

10. The method of claim 9, wherein the size of the second fake image is a size of a target image to be generated.

11. The method of claim 9, wherein the sizes of the first fake image and the first real image are as large as one of 4 times, 9 times, 16 times, and 25 times the sizes of the second fake image and the second real image.

12. The method of claim 8, wherein the first generating operation, the first verifying operation, the second generating operation, and the second verifying operation perform machine learning using at least one of a deep neural network (DNN), a convolutional neural network (CNN), and a recurrent neural network (RNN).

13. The method of claim 8, further comprising:
an image acquiring operation of acquiring an image generated in the second generating operation; and
an object detecting operation of detecting an object from the image acquired in the image acquiring operation.

14. The method of claim 13, wherein the object detecting operation detects the object using the CNN trained based on the image acquired by the image acquirer.

* * * * *